United States Patent
Ito et al.

(10) Patent No.: US 9,598,000 B2
(45) Date of Patent: Mar. 21, 2017

(54) VEHICLE LAMP SYSTEM

(71) Applicant: KOITO MANUFACTURING CO., LTD., Tokyo (JP)

(72) Inventors: Masayasu Ito, Shizuoka (JP); Takao Muramatsu, Shizuoka (JP); Yuta Maruyama, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/067,230

(22) Filed: Mar. 11, 2016

(65) Prior Publication Data

US 2016/0264042 A1   Sep. 15, 2016

(30) Foreign Application Priority Data

Mar. 12, 2015   (JP) .................................. 2015-049563

(51) Int. Cl.
*B60Q 1/14* (2006.01)
*B60Q 1/04* (2006.01)

(52) U.S. Cl.
CPC .................................... *B60Q 1/143* (2013.01)

(58) Field of Classification Search
None
See application file for complete search history.

(56) References Cited

U.S. PATENT DOCUMENTS

| | | | | |
|---|---|---|---|---|
| 5,796,094 A * | 8/1998 | Schofield | ............... | B60N 2/002 250/208.1 |
| 6,281,632 B1 * | 8/2001 | Stam | .................... | B60Q 1/085 250/208.1 |
| 2009/0086497 A1 * | 4/2009 | Kamioka | ............... | B60Q 1/085 362/466 |
| 2011/0012511 A1 * | 1/2011 | Watanabe | ............... | B60Q 1/085 315/82 |
| 2015/0002015 A1 * | 1/2015 | Hayakawa | ............. | B60Q 1/143 315/82 |
| 2015/0048736 A1 * | 2/2015 | Foltin | .................. | B60Q 1/1423 315/82 |

FOREIGN PATENT DOCUMENTS

JP    2013-147138 A    8/2013

* cited by examiner

*Primary Examiner* — Dedei K Hammond
(74) *Attorney, Agent, or Firm* — Osha Liang LLP

(57) ABSTRACT

A vehicle lamp system includes a camera which generates image information in a front region, a controller which generates a light distribution command for instructing a light distribution pattern based on the image information, a headlight which irradiates the front region such that the instructed light distribution pattern is obtained, and a position calibrator which detects a positional deviation between the camera and the headlight. The position calibrator detects a reference object based on the image information and measures a luminance of the reference object, and when there is a certain difference between a luminance of the reference object obtained from one light distribution pattern and a luminance of the reference object obtained from another light distribution pattern in which a light quantity of only a part is different from the one light distribution pattern, detects the positional deviation using a position of the part.

8 Claims, 11 Drawing Sheets

VEHICLE LAMP SYSTEM

CROSS-REFERENCE TO RELATED APPLICATIONS

The present application claims the benefit of priority of Japanese Patent Application No. 2015-049563, filed on Mar. 12, 2015, the content of which is incorporated herein by reference.

TECHNICAL FIELD

Aspects of the present invention relate to a vehicle lamp system which is to be used for an automobile and the like.

BACKGROUND

In general, a vehicle lamp is configured to switch between a low beam and a high beam. The low beam is to irradiate a close region with a predetermined illuminance. The light distribution regulations thereof are stipulated so as not to cause glare to an opposite vehicle and a leading vehicle. The low beam is mainly used during traveling in an urban area. On the other hand, the high beam is to irradiate a front wide range and a distant region with a relatively high illuminance, and is mainly used during high-speed traveling on a road on which opposite vehicles and leading vehicles are few. Therefore, while the high beam is better in the driver's visibility, as compared to the low beam, it causes the glare to a driver of a vehicle or a pedestrian in front of the vehicle.

In recent years, there has been suggested an Adaptive Driving Beam (ADB) technology of dynamically and adaptively controlling a light distribution pattern of the high beam based on surrounding states of a vehicle. The ADB technology is to detect whether a leading vehicle, an opposite vehicle or a pedestrian is in front of the vehicle and to reduce the light in a region corresponding to the vehicle or pedestrian, thereby reducing the glare which is to be caused to the vehicle or pedestrian.

FIG. 1 is a basic block diagram of a vehicle lamp system employing ADB. A vehicle lamp system (referred to as a lamp system) $2r$ includes a camera 10, a controller 12 and a headlight (high beam) 14. The camera 10 is configured to acquire an image of a region in front of the vehicle. The controller 12 is configured to detect a leading vehicle, an opposite vehicle, a pedestrian and the like based on image information S1 acquired by the camera 10, and to determine a light distribution pattern including a light-on area $R_{ON}$ in which the beam should be irradiated and a light-off area $R_{OFF}$ in which the beam should not be irradiated. The controller 12 is configured to generate a light distribution command S2 for instructing the light distribution pattern and to supply the same to the headlight 14. The headlight 14 is configured to irradiate a region in front of the vehicle based on the light distribution command S2 generated by the controller 12 such that a desired light distribution pattern is to be obtained (See, for example, JP-A-2013-147138).

In the lamp system $2r$ of FIG. 1, the mounting position precision of the camera 10 and the headlight 14 may be important. If the mounting positions thereof deviate, an area in which the light should be originally shielded is irradiated, so that the glare is caused.

For this reason, in the related art, the light-off area $R_{OFF}$ is set, considering the possible deviation of the mounting positions of the camera 10 and the headlight 14. Specifically, when a leading vehicle or an opposite vehicle is detected from an image of the camera 10, an area obtained by adding a margin to an area $R_X$ in which the leading vehicle or the opposite vehicle exists is set as the light-off area, so that the glare is prevented.

Incidentally, a control method of the light distribution pattern by the headlight 14 includes (1) a division method of dividing an irradiation area into a plurality of small areas and switching the light-on and light-off in each small area, (2) a scanning method of scanning a beam to a region in front of the vehicle and switching the light-on and light-off every predetermined time, and the like. The headlight 14 which is to be used for the ADB system has been developed so as to control the light distribution with higher precision. For example, in the division method, the number of divisions is increased to perform the high-precision light distribution control, and in the scanning method, a temporal resolution of the light-on/light-off switching is increased to perform the high-precision light distribution control.

When the controller 12 determines the light distribution pattern by taking a wide margin of the light-off area, considering the positional deviation, the superiority of the high-precision headlight 14 is lost, so that the headlight 14 is overengineered.

SUMMARY

The present invention has been made in view of the above circumstances, and an aspect of the present invention provides a vehicle lamp system capable of detecting positional deviation between a camera and a headlight.

According to an aspect of the present invention, there is provided a vehicle lamp system including: a camera configured to take an image of a region in front of a vehicle to generate image information; a controller configured to generate a light distribution command for instructing a light distribution pattern to be formed in the region in front of the vehicle based on the image information from the camera; a headlight configured to irradiate the region in front of the vehicle such that the instructed light distribution pattern is obtained, based on the light distribution command; and a position calibrator configured to detect a positional deviation between the camera and the headlight. The position calibrator is configured to execute: detecting a reference object on a road based on the image information and measuring a luminance of the reference object; and when there is a certain difference between a luminance of the reference object obtained from one light distribution pattern and a luminance of the reference object obtained from another light distribution pattern in which a light quantity of only a part is different from the one light distribution pattern, detecting the positional deviation using a position of the part.

A lamp coordinate system may be defined for a headlight and a camera coordinate system may be defined for a camera. In this case, when a luminance of a reference object obtained from the camera is changed at change in a light quantity of a part of the lamp coordinate system by the headlight, it is possible to associate coordinates of the reference object in the camera coordinate system and coordinates of the part of the lamp coordinate system, in which the light quantity has been changed. Therefore, according to the above configuration, it is possible to detect the positional deviation between the camera and the headlight and to calibrate the same if necessary.

A "certain difference of the luminance" may refer to a luminance difference, which can be recognized as a luminance change caused due to a change in the light distribution pattern, not a luminance difference caused due to an ambient light or a noise.

In the vehicle lamp system, the position calibrator may include: a reference object detector configured to detect the reference object based on the image information and to generate luminance data indicating a luminance of the reference object; a pattern generator configured to generate a light distribution command for instructing a switchable light distribution pattern for calibration; and a positional deviation detector configured to determine whether there is the certain difference between the luminance data obtained from the one light distribution pattern and the luminance data obtained from the another light distribution pattern, and to generate calibration data in accordance with a determination result.

In the vehicle lamp system, the position calibrator may be configured to execute:

(i) providing the headlight with a first light distribution command for instructing the one light distribution pattern;

(ii) acquiring a luminance of the reference object from first image information which is obtained when the region in front of the vehicle is irradiated in accordance with the first light distribution command;

(iii) setting a second light distribution command for instructing the another light distribution pattern and providing the headlight with the same;

(iv) acquiring a luminance of the reference object from second image information which is obtained when the region in front of the vehicle is irradiated in accordance with the second light distribution command;

(v) detecting a difference between the luminance of the reference object obtained from the first image information and the luminance of the reference object obtained from the second image information;

(vi) when a certain luminance difference is detected in (v), detecting a positional deviation amount; and (vii) when the certain luminance difference is not detected in (v), returning to (iii), updating the other light distribution pattern while moving the part.

By repeating the operations, it may be possible to detect the part in which the luminance of the object can be changed.

In the vehicle lamp system, in (iii) for a first time, the part may be a position of the reference object. When the certain luminance difference is detected in (vi) for the first time, it may be determined that positions of the camera and the headlight are correct.

In the vehicle lamp system, in (iii), the part may be gradually separated away from a position of the reference object each time of the update.

In the vehicle lamp system, the reference object may include at least one of a predetermined sign, a delineator and a road image drawn on a road surface.

In the vehicle lamp system, the reference object may include a leading vehicle.

According to another aspect of the present invention, there is provided a vehicle lamp system including: a camera configured to take an image of a region in front of a vehicle to generate image information; a controller configured to generate a light distribution command for instructing a light distribution pattern to be formed in the region in front of the vehicle, based on the image information from the camera; a headlight configured to irradiate the region in front of the vehicle such that the instructed light distribution pattern is obtained, based on the light distribution command; a marker generator fixed with respect to the headlight and configured to irradiate a predetermine region in front of the vehicle with a marker; and a position calibrator configured to detect a positional deviation between the camera and the headlight based on a position of the marker appearing in the image information when the marker generator irradiates the region in front of the vehicle with the marker.

Since the marker is fixed with respect to the headlight, the irradiation to predetermined coordinates of the lamp coordinate system is guaranteed. Therefore, the marker coordinates of the camera coordinate system obtained from the image information and the predetermined coordinates of the lamp coordinate system may be associated with each other. Therefore, according to this aspect, it is possible to detect the positional deviation between the camera coordinate system and the lamp coordinate system and to calibrate the same if necessary.

Incidentally, any combination of the above constitutional elements and the replacements of the constitutional elements and expressions of the present invention in a method, a device, a system and the like are also effective as the aspects of the present invention.

According to the above configuration, the positional deviation between the camera and the headlight can be detected.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Figure 1:
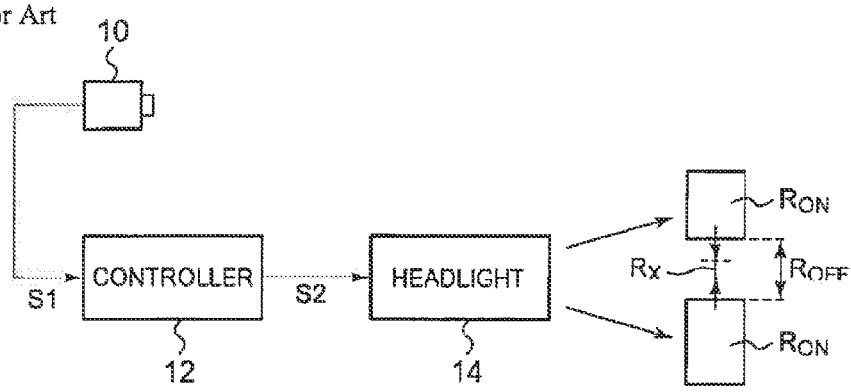
FIG. 1 is a basic block diagram of a vehicle lamp system employing ADB.

Hereinafter, illustrative embodiments of the present invention will be described with reference to the drawings. The same or equivalent constitutional elements shown in the respective drawings are denoted with the same reference numerals and the overlapping descriptions thereof are appropriately omitted. The illustrative embodiments are not limitative but exemplary, and any features and combinations thereof described in the illustrative embodiments are not necessarily essential to the present invention.

First Illustrative Embodiment

Figure 2:
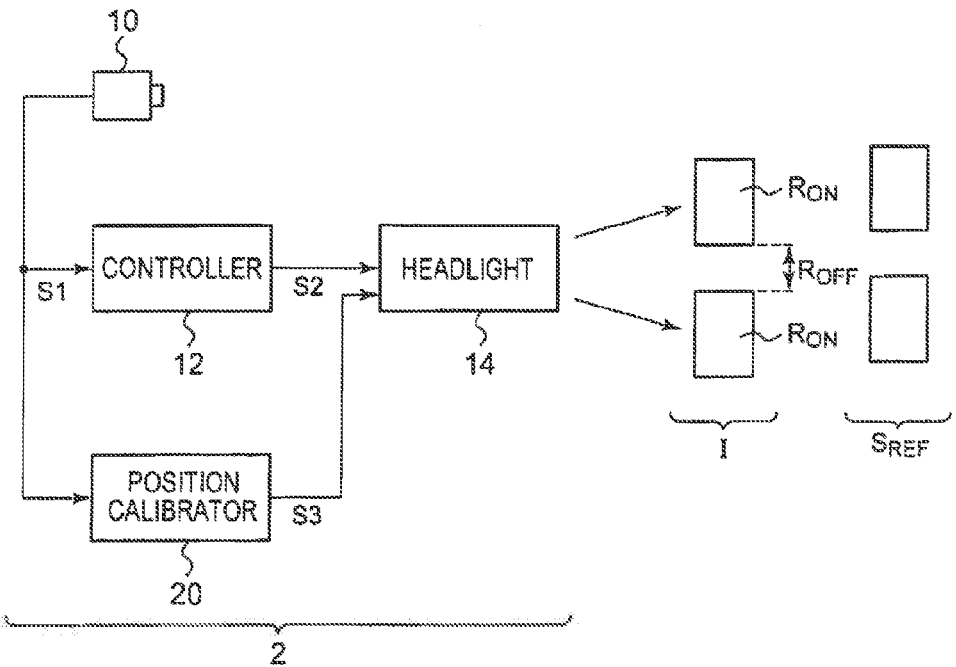
FIG. 2 is a block diagram showing a lamp system according to a first illustrative embodiment.

FIG. 2 is a block diagram showing a lamp system 2 according to a first illustrative embodiment. The lamp system 2 has an ADB function and is configured to form various light distribution patterns in a region in front of a vehicle.

The lamp system 2 includes a camera 10, a controller 12, a headlight 14 and a position calibrator 20. The headlight 14 has a high beam with the ADB function The camera 10 is configured to take an image of a region in front of the vehicle to generate image information S1. The controller 12 is configured to generate a light distribution command S2 for instructing a target light distribution pattern $S_{REF}$ to be formed in the region in front of the vehicle, based on the image information S1 from the camera 10. The light distribution pattern is configured by a combination of a light-off area in which the light is not to be irradiated and a light-on area in which the light is to be irradiated. A light quantity of the light-on area may be varied. For example, the controller 12 is configured to detect a leading vehicle, an opposite vehicle, a pedestrian or the like based on the image information S1, and to set an area in which the object is detected, as the light-off area so that glare is not caused or to set the area as the light-on area of which the light quantity is very small. The controller 12 may be input with vehicle speed information and steering information, and may be configured to reflect the additional information in the target light distribution pattern $S_{REF}$.

The controller 12 may be configured by a combination of hardware such as a Central Processing Unit (CPU), a micro controller or the like and software. The controller 12 may be a part of a lamp Electronic Control Unit (ECU) embedded in a vehicle lamp (lamp assembly) or a part of a vehicle ECU mounted on a vehicle.

The headlight 14 is configured to irradiate the region in front of the vehicle such that the target light distribution pattern $S_{REF}$ is to be obtained, based on the light distribution command S2. The light distribution pattern which is to be actually formed in the region in front of the vehicle by the headlight 14 based on the vehicle information S2 is referred to as an irradiation pattern I.

When there is no positional deviation between the camera 10 and the headlight 14, the irradiation pattern I coincides with the target light distribution pattern $S_{REF}$. On the other hand, when attachment positions of the camera 10 and the headlight 14 deviate, the irradiation pattern I becomes different from the target light distribution pattern $S_{REF}$.

The lamp system 2 of FIG. 2 includes the position calibrator 20 configured to detect deviation between the attachment positions of the camera 10 and the headlight 14. In the below, a method of detecting the positional deviation by the position calibrator 20 is described.

The position calibrator 20 is configured to detect the positional deviation by following operations.

(Operation 1) The position calibrator 20 is configured to detect a reference object on a road based on the image information S1, and to measure a luminance of the reference object.

The reference object may be a road sign, a delineator, a stop line or a road image drawn on a road surface. Alternatively, as described below, a vehicle may be used as the reference object. The reference object is preferably an object having a property that it reflects the light irradiated by the headlight 14, not a light-emitting object. The position calibrator 20 may be configured to detect the reference object by using information from an automobile navigation system.

In the below, for ease of understanding, it is assumed that the reference object is a road sign having a predetermined shape and a predetermined color and having a predetermined letter or design drawn thereon. The position calibrator 20 is configured to refer to the image information S1, to detect the reference object in an image by pattern matching, and to specify coordinates of the reference object.

(Operation 2) When there is a certain (significant) difference between a luminance $L_{REF}$ of the reference object obtained from one light distribution pattern and a luminance of the reference object obtained from another light distribution pattern in which a light quantity of only a part (referred to as an attention area) is different from the one light distribution pattern, the positional deviation is detected using a position of the part (the attention area).

The above is a basic configuration of the lamp system 2 according to the first illustrative embodiment. Next, positional deviation detection processing (calibration) is described.

Figure 3:
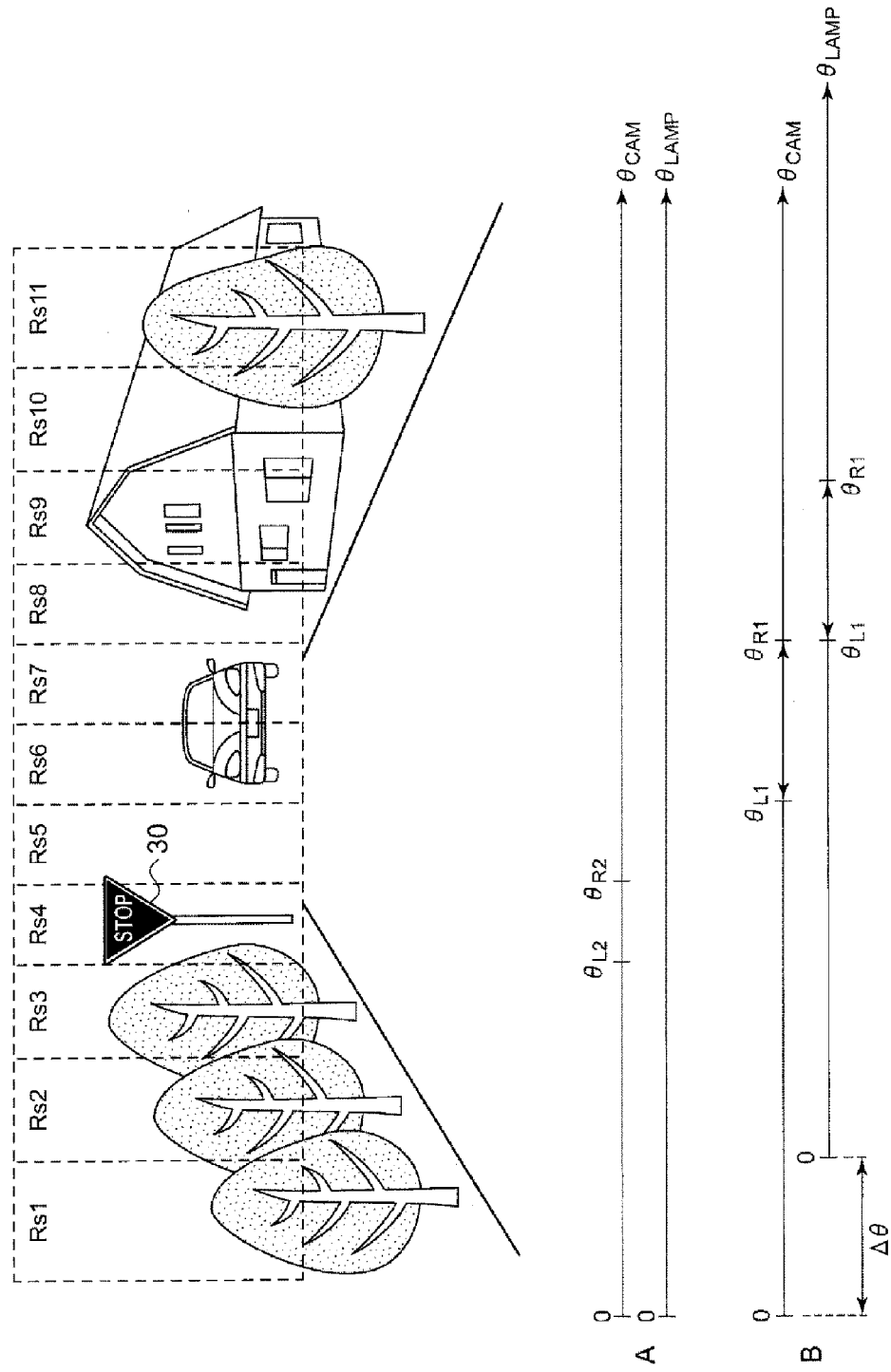
FIG. 3 shows a region in front of a vehicle.

FIG. 3 shows a region in front of the vehicle.

In this example, the headlight 14 is configured to perform the ADB control by the division method. Specifically, the irradiation area is divided into eleven small areas Rs1 to Rs11, and the headlight 14 is configured to switch the light-on and light-off for each small area Rs. Positions of the small areas Rs1 to Rs11 are changed depending on an attachment position of the headlight 14.

For ease of understanding, a camera coordinate system $\theta_{CAM}$ based on the attachment position of the camera 10 and a lamp coordinate system $\theta_{LAMP}$ based on the attachment position of the headlight 14 are introduced. In the first illustrative embodiment, it is assumed that each coordinate system has an angle dimension. When the attachment position of the camera 10 and the attachment position of the headlight 14 are correct, origins of the coordinate systems $\theta_{CAM}$, $\theta_{LAMP}$ coincide with each other, as shown in a part A of FIG. 3.

When a positional deviation occurs between the camera 10 and the headlight 14, the origins of the coordinate systems $\theta_{CAM}$, $\theta_{LAMP}$ are out of alignment, as shown in a part B of FIG. 3. Herein, a case where only the headlight 14 is out of alignment is shown. However, the positional deviation may occur both for the camera 10 and the headlight 14.

The controller 12 is configured to generate a light distribution command S2 based on the image information S1 generated by the camera 10. Therefore, the light distribution command S2 is generated based on the camera coordinate system $\theta_{CAM}$. In the meantime, the headlight 14 is configured to irradiate the region in front of the vehicle based on the lamp coordinate system $\theta_{LAMP}$ while assuming that the camera coordinate system $\theta_{CAM}$ and the lamp coordinate system $\theta_{LAMP}$ coincide with each other.

The ADB control upon normal traveling is described when the coordinate systems are out of alignment as shown in the part B. As shown in FIG. 3, when an opposite vehicle 32 is recognized between coordinates [$\theta_{L1}$ to $\theta_{R1}$] (the small areas Rs6, Rs7) in the camera coordinate system $\theta_{CAM}$, the controller 12 generates a light distribution pattern in which a range of the coordinates [$\theta_{L1}$ to $\theta_{R1}$] is set as the light-off range. The headlight 14 irradiates the region in front of the vehicle while regarding the coordinates [$\theta_{L1}$ to $\theta_{R1}$] of the lamp coordinate system $\theta_{LAMP}$ as the light-off range. As a result, the small areas Rs8, Rs9 become the light-off range $R_{OFF}$ and the small areas Rs6, Rs7 become the light-on area $R_{ON}$, so that the glare is caused to the opposite vehicle 32.

Next, calibration processing for solving this problem is described. Based on the image information S1 from the camera 10, a 'stop sign' is detected as the reference object 30 within a range of [$\theta_{L2}$ to $\theta_{R2}$] of the camera coordinate system $\theta_{CAM}$. Herein, for easy of understanding and simple explanation, it is assumed that the vehicle is stationary and a field of view in front of the vehicle is not changed during the calibration.

The position calibrator 20 switches between at least two light distribution patterns and enables the headlight 14 to irradiate the range in front of the vehicle for the calibration. In one light distribution pattern and another light distribution pattern, the light quantity of only the part (the attention area) θx to θy are different and the light quantities of the other parts are the same.

For example, one light distribution pattern is set such that all ranges are light-on. The other light distribution pattern is set such that only the range of [θx to θy] is light-off and the other ranges are light-on. It is assumed that when the two light distribution patterns are switched, the luminance of the reference object 30 is changed. In this case, it can be said that the coordinates [$θ_{L2}$ to $θ_{R2}$] of the camera coordinate system $θ_{CAM}$ correspond to the coordinates [θx to θy] of the lamp coordinate system $θ_{LAMP}$. That is, when the coordinates of a left end are taken as a reference, a deviation amount between the camera coordinate system $θ_{CAM}$ and the lamp coordinate system $θ_{LAMP}$ is [$θ_{L2}$−θx]. Regarding the coordinates, any reference can be taken. For example, when the coordinates of a right end are taken as a reference, the deviation amount is [$θ_{R2}$−θy]. Alternatively, a reference may be taken at a center. In the below, the description is made while the left end as a reference.

In other words, the calibration to be performed by the position calibrator 20 is equivalent to the detection of the attention area [θx to θy] in which the luminance of the reference object 30 can be changed.

For example, a case where there is no positional deviation is considered (refer to the part A of FIG. 3). In this case, when the attention area [θx to θy] is set to [$θ_{L2}$ to $θ_{R2}$], the luminance change of the reference object 30 is detected. Since the deviation amount is $θ_{L2}$−θx=$θ_{L2}$−$θ_{L2}$=0, it is confirmed that there is no positional deviation.

A case where there is a positional deviation is considered (refer to the part B of FIG. 3). In this case, when the attention area [θx to θy] is set to [$θ_{L2}$−Δθ to $θ_{R2}$−Δθ], the luminance change of the reference object 30 is detected. Since the deviation amount is $θ_{L2}$−θx=$θ_{L2}$−($θ_{L2}$−Δθ)=Δθ, it coincides with the deviation amount Δθ of the coordinate system.

In this way, according to the lamp system 2 of FIG. 2, it is possible to detect the positional deviation between the camera 10 and the headlight 14 and to perform the calibration if necessary.

The calibration method is not particularly limited. For example, when the controller 12 generates the light distribution command S2, angle information in which the deviation amount Δθ has been corrected may be provided. Alternatively, the deviation amount Δθ may be held for the headlight 14, and the angle information indicated by the light distribution command S2 may be shifted, considering the deviation amount Δθ.

Next, the configuration of the position calibrator 20 and a flow of the calibration are described in detail. Incidentally, the present invention includes various aspects that can be appreciated from the above description, and is not limited to specific examples which are to be described in the below.

Figure 4:
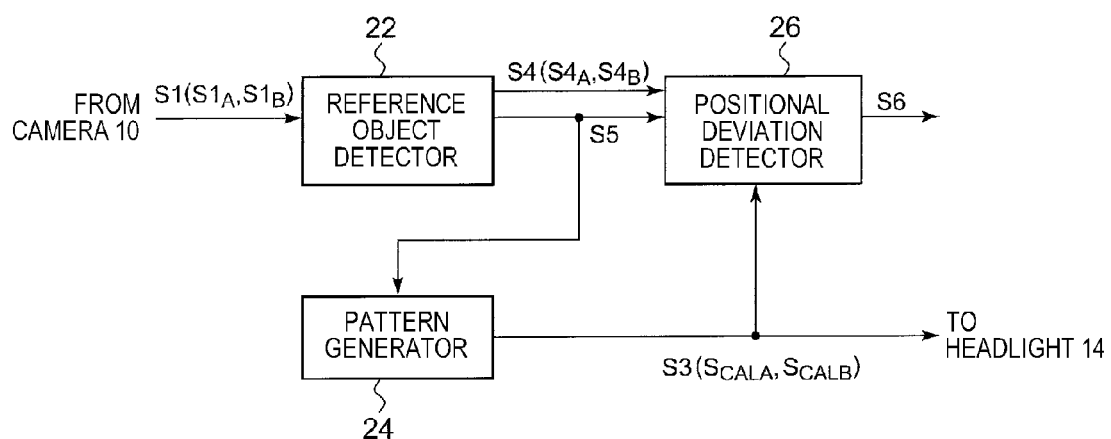
FIG. 4 is a functional block diagram showing a configuration example of a position calibrator.

FIG. 4 is a functional block diagram showing a configuration example of the position calibrator 20. The position calibrator 20 includes a reference object detector 22, a pattern generator 24 and a positional deviation detector 26.

The position calibrator 20 may be configured by a combination of hardware such as a Central Processing Unit (CPU), a micro controller or the like and software, like the controller 12. The position calibrator 20 may be a part of a lamp Electronic Control Unit (ECU) embedded in a vehicle lamp (lamp assembly) or a part of a vehicle ECU mounted on a vehicle. The controller 12 and the position calibrator 20 may be the same processor or CPU.

The reference object detector 22 is configured to detect the reference object 30 by the pattern matching based on the image information S1 from the camera 10 and to generate luminance data S4 indicating the luminance of the reference object 30. The reference object detector 22 may be configured to generate position data S5 indicating a position [$θ_{L2}$ to $θ_{R2}$] of the reference object 30 in the camera coordinate system.

The pattern generator 24 is configured to generate a light distribution command S3 for instructing a switchable light distribution pattern for calibration. At the calibration, the headlight 14 is controlled by the light distribution command S3.

The positional deviation detector 26 is configured to determine whether there is a certain (significant) difference between luminance data $S4_A$ obtained from one light distribution pattern $S_{CALA}$ and luminance data $S4_B$ obtained from another light distribution pattern $S_{CALB}$. Then, the positional deviation detector 26 is configured to generate calibration data S6 in accordance with a determination result.

When it is intended to enable a driver or a surrounding pedestrian not to recognize the calibration, it is necessary to switch the light distribution pattern in a short time. In this case, it is possible to perform the calibration on the background by normally outputting the one light distribution pattern $S_{CALA}$ and switching the same to the other light distribution pattern $S_{CALB}$ for a short time period. In this case, when generating the image information $S1_B$ which is to be used for generation of the luminance data $S4_B$, it is necessary to pay attention to exposure time and exposure timing of the camera 10.

The positional deviation detector 26 is configured to detect an area [θx to θy] in which the luminance of the light distribution pattern $S_{CALA}$ and the luminance of the light distribution pattern $S_{CALB}$ are different. The positional deviation detector 26 may be configured to generate the calibration data S6 indicating the deviation amount 40 based on a relation between the area [θx to θy] in which the certain (significant) luminance change is detected and a position [$θ_{L2}$ to $θ_{R2}$] indicated by the position data S5.

The position calibrator 20 is configured to switch a combination of the light distribution pattern $S_{CALA}$ and the other light distribution pattern $S_{CALB}$ until the certain (significant) luminance change is detected by the positional deviation detector 26.

According to the configuration of the position calibrator 20, it is possible to detect whether there is any positional deviation and the deviation amount Δθ.

Figure 5:
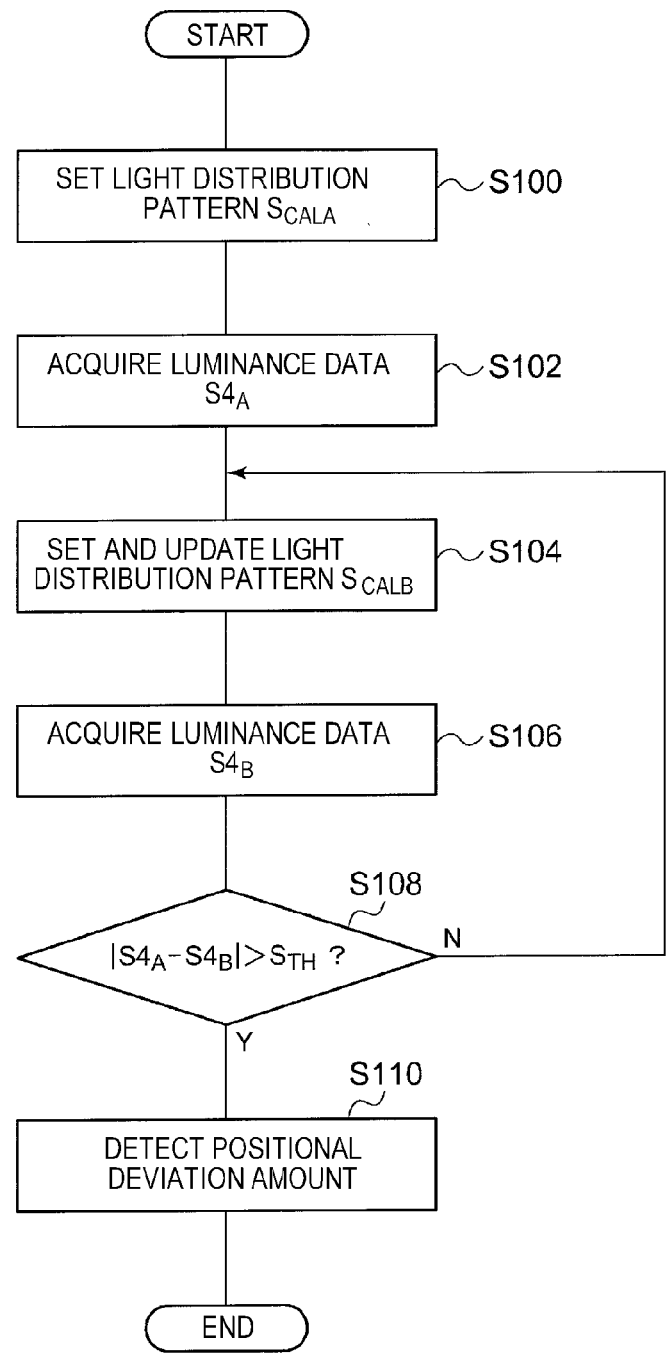
FIG. 5 is a first flowchart of calibration processing.

FIG. 5 is a first flowchart of the calibration processing.

First, the reference light distribution pattern $S_{CALA}$ is set (S100), and the luminance data $S4_A$ at that time is measured (S102). The light distribution pattern $S_{CALA}$ may be any pattern, for example, an all-area light-on pattern or all-area light-off pattern. Alternatively, in case of the calibration during the traveling, the target light distribution pattern $S_{REF}$ just previously generated by the controller 12 may be used.

Subsequently, the other light distribution pattern $S_{CALB}$ is set (S104) and the luminance data $S4_B$ at that time is measured (S106). As described above, the light distribution pattern $S_{CALB}$ and the light distribution pattern $S_{CALA}$ have a relation in which the light quantities of only the attention area [θx to θy] are different.

When an absolute value $|S4_A-S4_B|$ of the luminance difference is greater than a predetermined threshold value $S_{TH}$ (Y in S108), i.e., when the certain (significant) luminance difference is detected, the positional deviation amount is calculated based on the attention area [θx to θy] at that time (S110).

When the luminance difference $|S4_A-S4_B|$ is less than the threshold value $S_{TH}$ (N in S108), i.e., when the certain (significant) luminance difference is not detected, the processing returns to step S104 and the attention area [θx to θ] is changed to update the light distribution pattern $S_{CALB}$.

By the above flow, the positional deviation amount can be detected.

Figure 6:
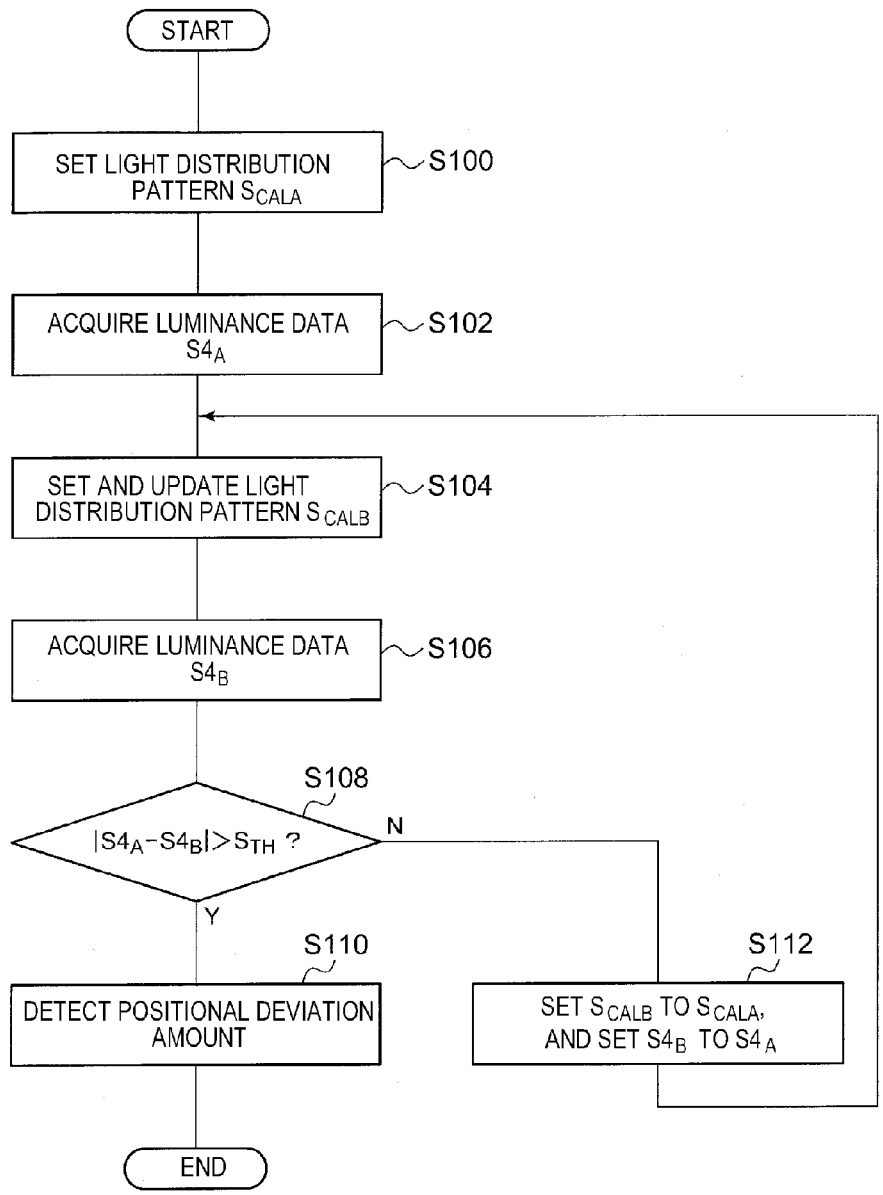
FIG. 6 is a second flowchart of calibration processing.

FIG. 6 is a second flowchart of the calibration processing. In the flowchart of FIG. 5, the light distribution pattern $S_{CALA}$ is fixed to the initial state set at the first time and only the light distribution pattern $S_{CALB}$ is changed. In contrast, according to the flowchart of FIG. 6, the light distribution pattern $S_{CALB}$ of one cycle is used as the reference light distribution pattern $S_{CALA}$ of a next cycle.

Specifically, step S112 is added. When it is determined in step S108 that the luminance difference $|S4_A-S4_B|$ is less than the threshold value $S_{TH}$ (N in S108), i.e., when the certain (significant) luminance difference is not detected, the previous light distribution pattern $S_{CALB}$ for comparison is set as the reference light distribution pattern $S_{CALA}$, and the previous luminance data $S4_B$ for comparison is set as the reference luminance data $S4_A$. In step S104, the light distribution pattern $S_{CALB}$ is updated.

By this flow, the positional deviation amount can be detected. In particular, when performing the calibration during the traveling, it can be said that the flow of FIG. 6 may be more advantageous.

Next, a generation algorithm of the light distribution command S3 for calibration by the pattern generator 24, i.e., the processing of step S104 of FIG. 5 or FIG. 6 is described.

The pattern generator 24 may be configured to shift the attention area [θx to θy] to be gradually separated away from the coordinates [$θ_{L2}$ to $θ_{R2}$] (the initial value) of the reference object 30 indicated by the position data S5.

Figure 7:
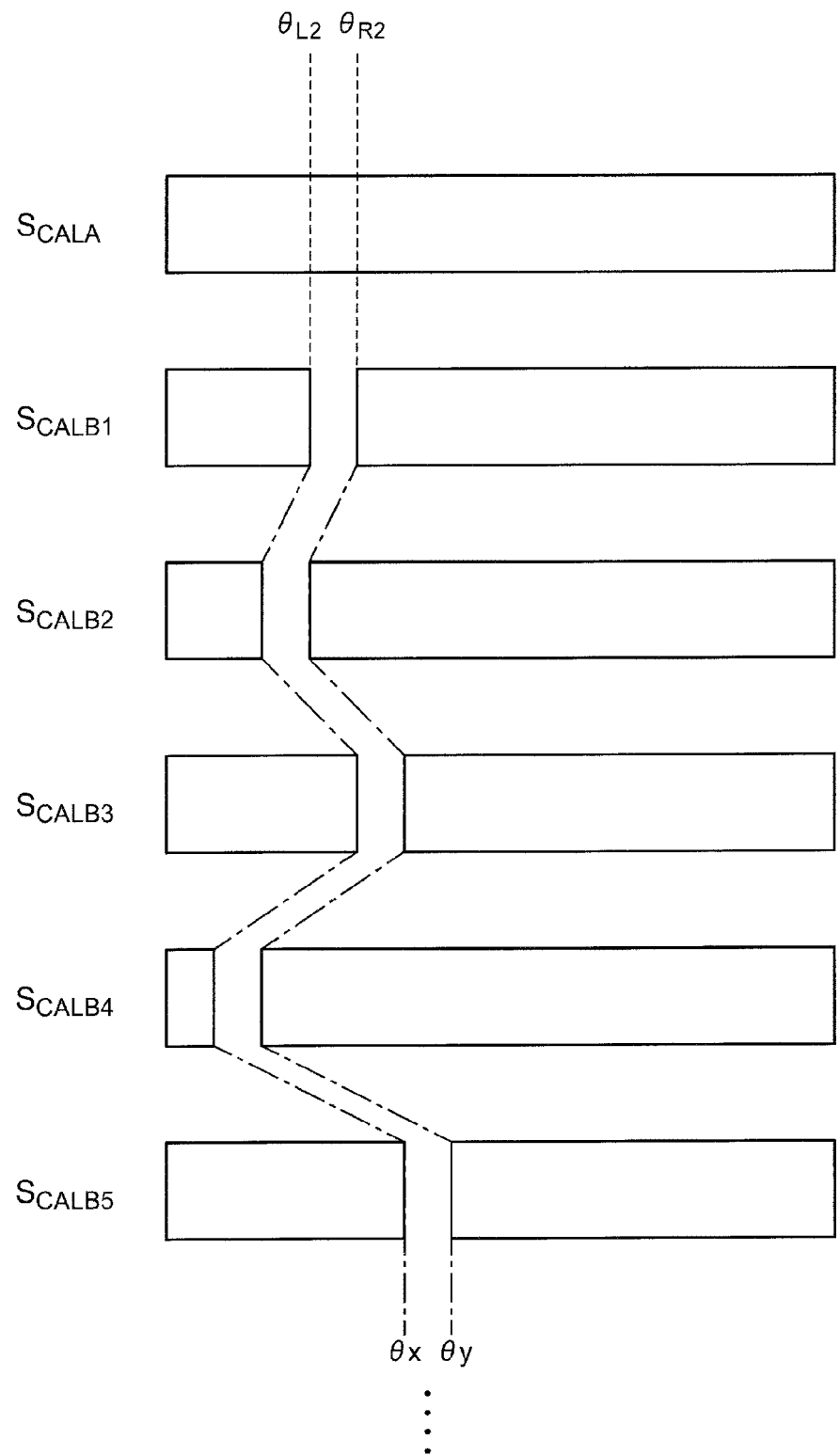
FIG. 7 shows transition of a light distribution pattern corresponding to the flowchart of FIG. 5.

FIG. 7 shows transition of the light distribution pattern $S_{CALB}$ corresponding to the flowchart of FIG. 5. The attention area [θx to θy] is shifted to be gradually separated away from the coordinates [$θ_{L2}$ to $θ_{R2}$] (the initial value). In FIG. 7, the attention area moves in a zigzag form but may move in another pattern.

Figure 8:
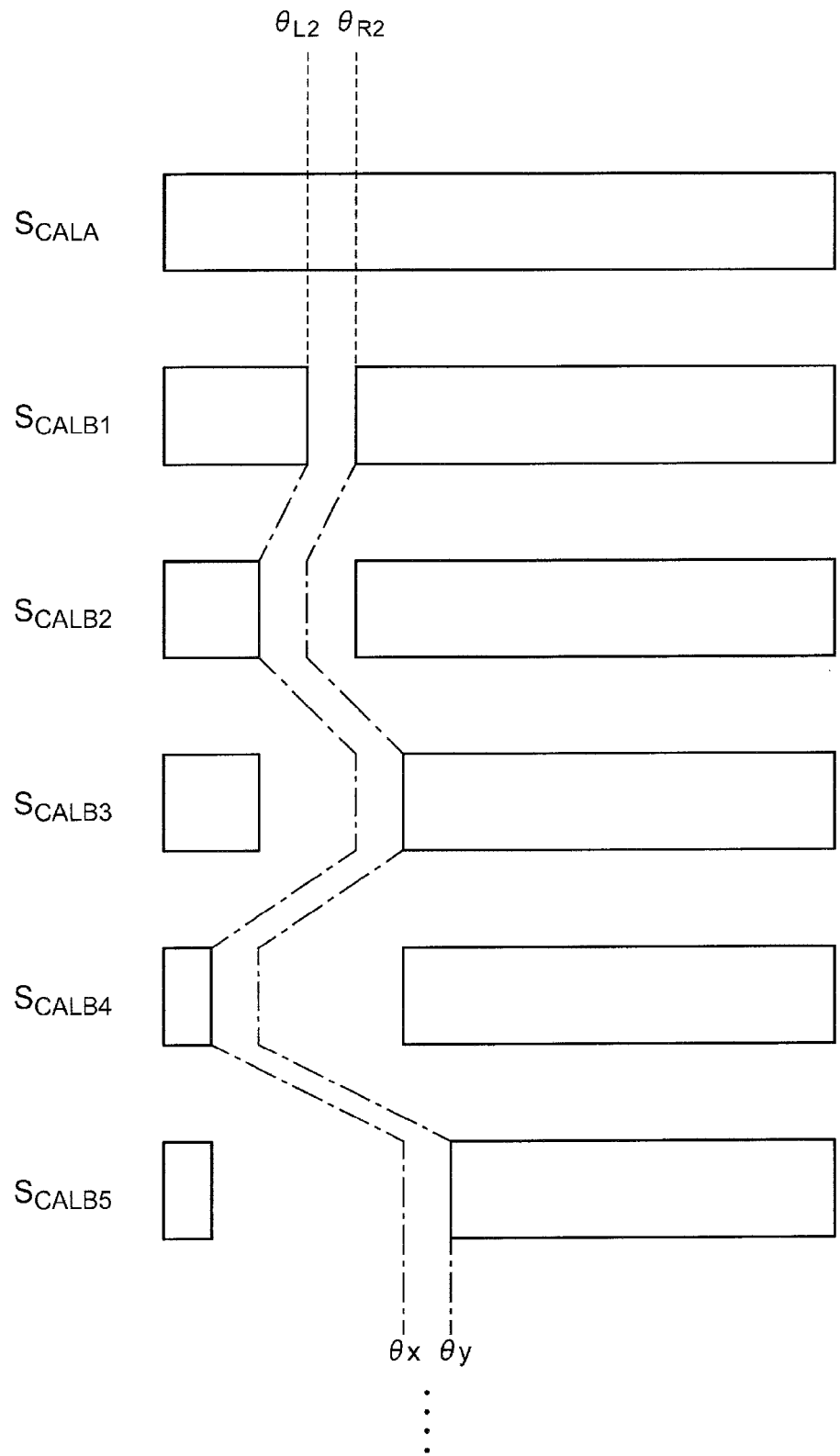
FIG. 8 shows transition of a light distribution pattern corresponding to the flowchart of FIG. 6.

FIG. 8 shows transition of the light distribution pattern $S_{CALB}$ corresponding to the flowchart of FIG. 6. The attention area [θx to θy] is shifted to be gradually separated away from the coordinates [$θ_{L2}$ to $θ_{R2}$] (the initial value).

When the flowchart of FIG. 5 is used, the light distribution pattern $S_{CAL2}$ is different at two places in one cycle and an adjacent cycle, as shown in FIG. 7. On the other hand, when the flowchart of FIG. 6 is used, the light distribution pattern $S_{CAL2}$ is different only at one place in one cycle and an adjacent cycle, as shown in FIG. 8, and it is difficult for a driver or a surrounding pedestrian to recognize the same. Therefore, when performing the calibration on the background, it can be said that the flowchart of FIG. 6 may be more advantageous.

Modified Embodiment 1

In the above illustrative embodiment, a stop sign, a road image or a delineator is used as the reference object 30. When performing the calibration on the background during the traveling, a stationary object moves in the image information S1 and it is thus necessary to again capture a position of the reference object 30 from time to time.

Considering the calibration during the traveling, it is preferably to set, as the reference object, an object of which a relative speed to the own vehicle is small. During the traveling on an express highway or an arterial highway, the leading vehicle and the own vehicle often move at the substantially same speed. Therefore, in this modified embodiment, a leading vehicle 34 is used as the reference object 30.

When using the leading vehicle 34 as the reference object 30, it is necessary to make consideration so as not to cause the glare during the calibration.

FIGS. 9A to 9D show the calibration in which the leading vehicle is used as the reference object 30. During the night traveling, the leading vehicle 34 is captured by the image of the camera 10, and the controller 12 determines the target light distribution pattern $S_{REF}$ such that the glare is not caused to the leading vehicle 34. The headlight 14 irradiates the region in front of the vehicle such that the target light distribution pattern $S_{REF}$ is to be obtained.

Figure 9A:
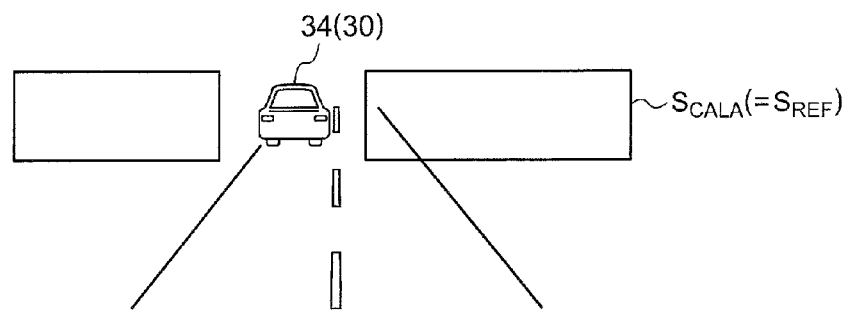
FIGS. 9A to 9D show calibration using a leading vehicle as a reference object.
Figure 9B:
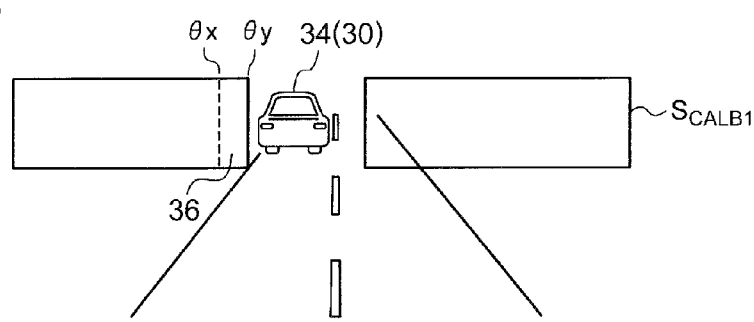
Figure 9C:
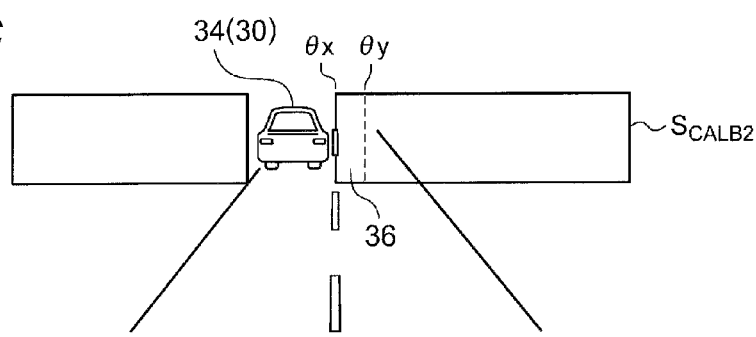
Figure 9D:
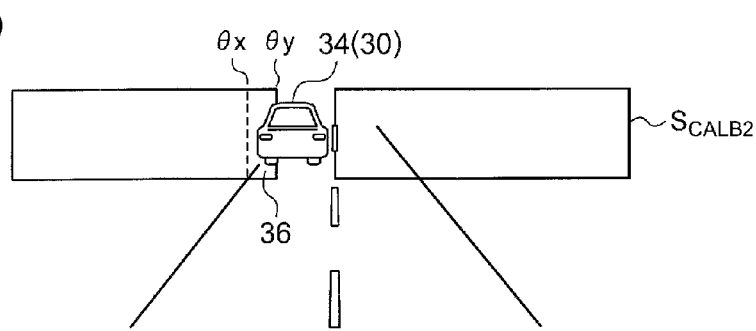

Herein, the light distribution pattern $S_{CAL2}$ is switched based on the flowchart of FIG. 6. The range [θx to θy] of the attention area 36 gradually moves in a direction of coming close to the leading vehicle 34 from both sides of the leading vehicle 34. In FIG. 9D, the attention area 36 overlaps with the leading vehicle 34, and the luminance change of the reference object 30 is observed.

According to this modified embodiment, the glare is not caused to the leading vehicle, and the calibration can be performed during the traveling.

Modified Embodiment 2

Even though the leading vehicle 34 is used as the reference object 30, when the time period for which the light is irradiated to the reference object 30 is made to be shorter than a time period which can be recognized by a driver, the glare is not caused. Therefore, the same calibration as the stationary object may also be performed.

Second Illustrative Embodiment

Figure 10:
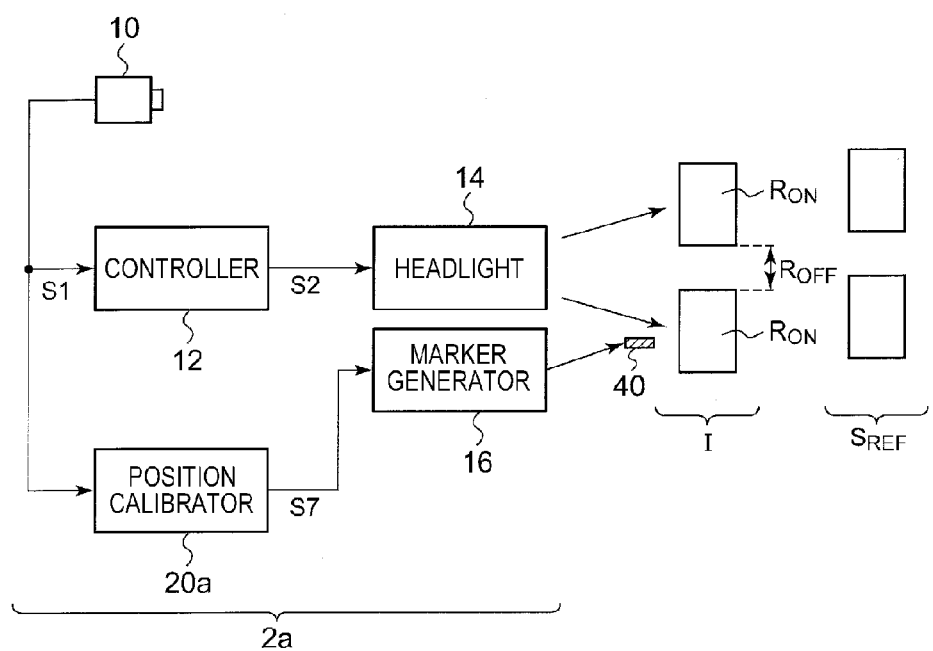
FIG. 10 is a block diagram showing a lamp system according to a second illustrative embodiment.

FIG. 10 is a block diagram showing a lamp system 2a according to a second illustrative embodiment. The lamp system 2a further includes a marker generator 16 in addition to the lamp system 2 of FIG. 2.

The marker generator 16 is fixed with respect to the headlight 14 and is configured to irradiate a marker 40 having a predetermined color and a predetermined shape to a predetermined region in front of the vehicle, in response to a light-emitting instruction S7 from a position calibrator 20a. The marker 40 is irradiated to a place which can be captured by the camera 10. The marker generator 16 is preferably a light source configured to generate light having high directionality, such as a light emitting diode, laser or the like.

The position calibrator 20a is configured to detect a relative positional deviation between the camera 10 and the headlight 14 based on a position of the marker 40 appearing in the image information S1 when the marker generator 16 irradiates the marker 40 in the region in front of the vehicle.

Figure 11:
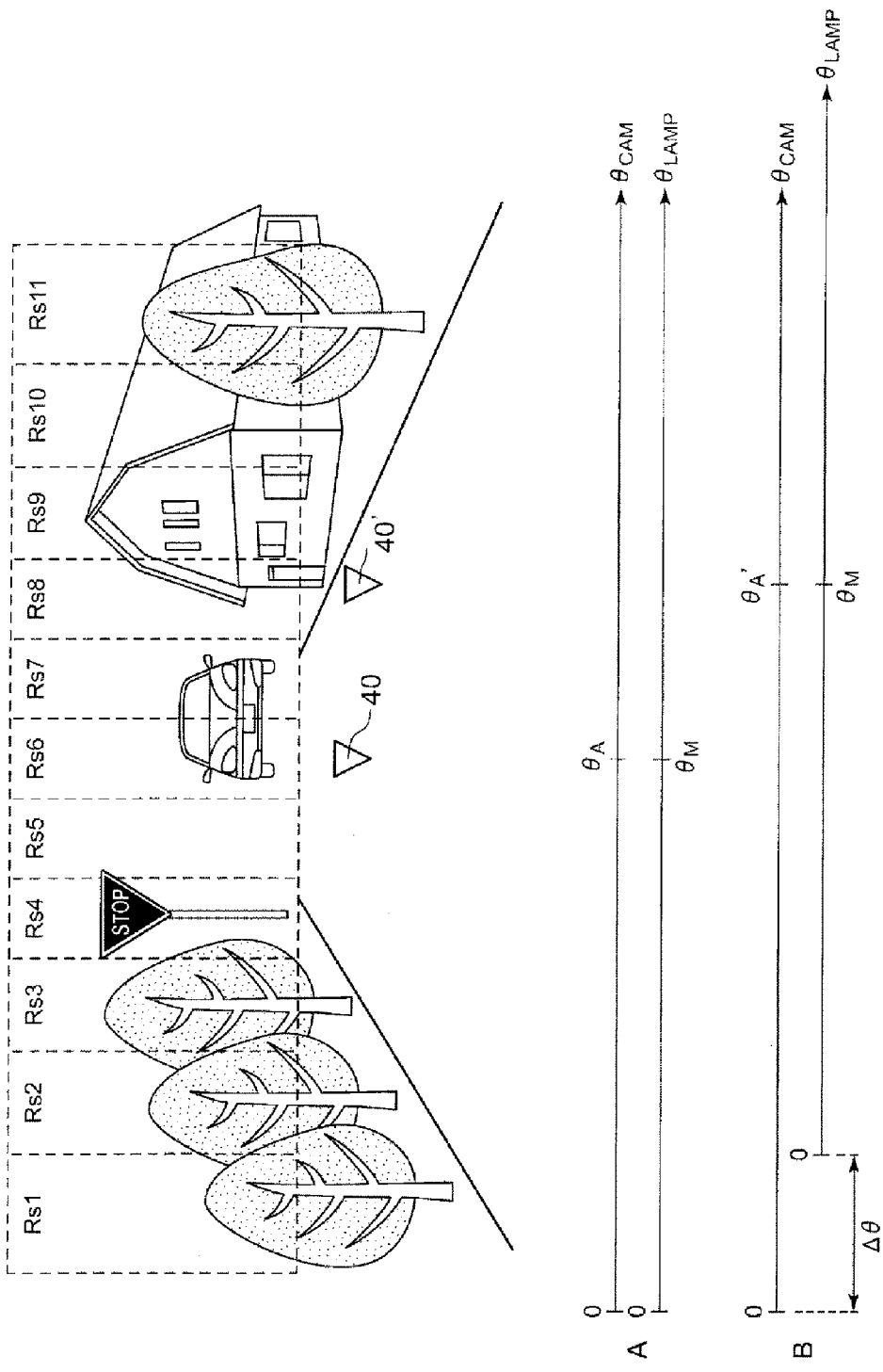
FIG. 11 shows a range in front of a vehicle.

FIG. 11 shows a region in front of the vehicle. Since the marker generator 16 is fixed to the headlight 14, the coordinates of the marker 40 always have a constant value $θ_M$ in the lamp coordinate system $θ_{LAMP}$, irrespective of the positional deviation of the headlight 14.

As shown in a part A of FIG. 11, when there is no positional deviation, the coordinates $\theta_A$ of the marker 40 in the lamp coordinate system $\theta_{LAMP}$ calculated from the image information S1 coincides with $\theta_M$.

As shown in a part B of FIG. 11, when the two coordinate systems deviate by $\Delta\theta$ due to the positional deviation, the coordinates $\theta_A'$ of the marker 40' in the lamp coordinate system $\theta_{LAMP}$ calculated from the image information S1 is $\theta_M+\Delta\theta$. That is, a difference between the coordinates $\theta_A$ and the coordinates $\theta_M$ of the marker 40 in the lamp coordinate system $\theta_{LAMP}$ calculated from the image information S1 indicates the deviation amount $\Delta\theta$ between the two coordinate systems.

In this way, according to the lamp system 2a of FIG. 10, it is possible to detect the positional deviation between the camera 10 and the headlight 14 and to calibrate the same if necessary.

Next, a configuration of the position calibrator 20a is described in detail. In the meantime, the present invention includes various aspects which can be appreciated from the above description, and is not limited to specific examples which are to be described in the below.

Figure 12:
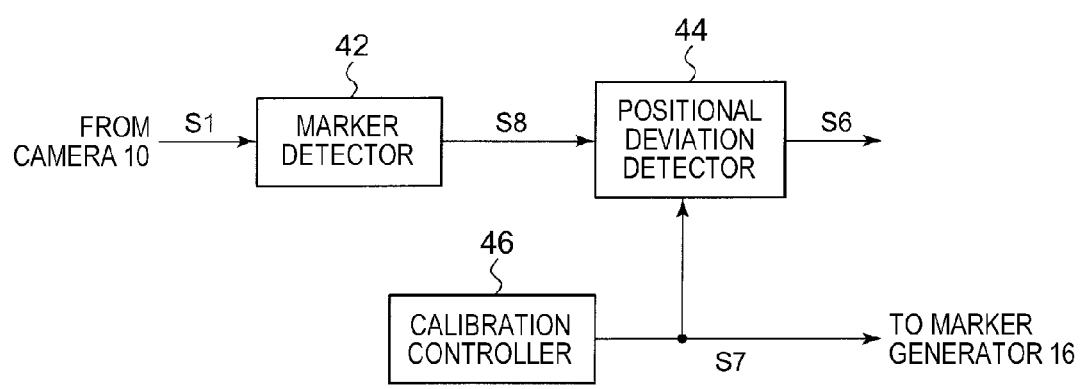
FIG. 12 is a functional block diagram showing a configuration example of a position calibrator.

FIG. 12 is a functional block diagram showing a configuration example of the position calibrator 20a. The position calibrator 20a includes a marker detector 42, a positional deviation detector 44 and a calibration controller 46.

The position calibrator 20a may be configured by a combination of hardware such as a Central Processing Unit (CPU), a micro controller or the like and software, like the controller 12. The position calibrator 20a may be a part of a lamp Electronic Control Unit (ECU) embedded in a vehicle lamp (lamp assembly) or a part of a vehicle ECU mounted on a vehicle. The controller 12 and the position calibrator 20a may be the same processor or CPU.

The calibration controller 46 is configured to issue the light-emitting instruction S7 and to turn on the marker generator 16. The light-emitting timing by the light-emitting instruction S7 is synchronized with the exposure timing by the camera 10.

The marker detector 42 is configured to detect the marker 40 by the pattern matching based on the image information S1 from the camera 10, to generate position data S8 indicating the position $\theta_A$ of the marker 40 in the camera coordinate system, and to output the same to the positional deviation detector 44.

The positional deviation detector 44 is configured to generate the calibration data S6 based on a relation between the coordinates $\theta_A$ of the marker 40 detected when the light-emitting instruction S7 is issued and the reference position $\theta_M$ of the marker 40.

In het above, the present invention has been described with reference to the illustrative embodiments. The illustrative embodiments are just exemplary. The combinations of the respective constitutional elements or respective processing processes can be variously modified, and the modified embodiments are also within the scope of the present invention. In the below, further modified embodiments are described.

In the above illustrative embodiments, the ADB control based on the division method has been described. However, the headlight 14 may be configured to vary the light distribution pattern by the scanning method or other methods.

Typically, it is the high beam which the light distribution pattern thereof is controlled by the ADB control. However, the present invention is not limited thereto. For example, the present invention can also be applied to the headlight 14 of which the light distribution pattern of the low beam is variable.

Although the present invention has been described using the specific wordings with reference to the illustrative embodiments, the illustrative embodiments are just provided to show the principle and applications of the present invention. That is, regarding the illustrative embodiments, various modified embodiments and the changes in the arrangement can be made without departing from the spirit of the present invention defined in the claims.

What is claimed is:

1. A vehicle lamp system comprising:
   a camera configured to take an image of a region in front of a vehicle to generate image information;
   a controller configured to generate a light distribution command for instructing a light distribution pattern to be formed in the region in front of the vehicle based on the image information from the camera;
   a headlight configured to irradiate the region in front of the vehicle such that the instructed light distribution pattern is obtained, based on the light distribution command; and
   a position calibrator configured to detect a positional deviation between the camera and the headlight,
   wherein the position calibrator is configured to execute:
      detecting a reference object on a road based on the image information and measuring a luminance of the reference object; and
      when there is a certain difference between a luminance of the reference object obtained from one light distribution pattern and a luminance of the reference object obtained from another light distribution pattern in which a light quantity of only a part of the another light distribution pattern is different from the one light distribution pattern, detecting the positional deviation using a position of the part.

2. The vehicle lamp system according to claim 1, wherein the position calibrator comprises:
   a reference object detector configured to detect the reference object based on the image information and to generate luminance data indicating a luminance of the reference object;
   a pattern generator configured to generate a light distribution command for instructing a switchable light distribution pattern for calibration; and
   a positional deviation detector configured to determine whether there is the certain difference between the luminance data obtained from the one light distribution pattern and the luminance data obtained from the another light distribution pattern, and to generate calibration data in accordance with a determination result.

3. The vehicle lamp system according to claim 1, wherein the position calibrator is configured to execute:
   (i) providing the headlight with a first light distribution command for instructing the one light distribution pattern;
   (ii) acquiring a luminance of the reference object from first image information which is obtained when the region in front of the vehicle is irradiated in accordance with the first light distribution command;

(iii) setting a second light distribution command for instructing the another light distribution pattern and providing the headlight with the same;
(iv) acquiring a luminance of the reference object from second image information which is obtained when the region in front of the vehicle is irradiated in accordance with the second light distribution command;
(v) detecting a difference between the luminance of the reference object obtained from the first image information and the luminance of the reference object obtained from the second image information;
(vi) when a certain luminance difference is detected in (v), detecting a positional deviation amount; and
(vii) when the certain luminance difference is not detected in (v), returning to (iii), updating the other light distribution pattern while moving the part.

4. The vehicle lamp system according to claim 3, wherein in (iii) for a first time, the part is a position of the reference object, and
wherein when the certain luminance difference is detected in (vi) for the first time, it is determined that positions of the camera and the headlight are correct.

5. The vehicle lamp system according to claim 3, wherein in (iii), the part is gradually separated away from a position of the reference object each time of the update.

6. The vehicle lamp system according to claim 1, wherein the reference object includes at least one of a predetermined sign, a delineator and a road image drawn on a road surface.

7. The vehicle lamp system according to claim 1, wherein the reference object includes a leading vehicle.

8. A vehicle lamp system comprising:
a camera configured to take an image of a region in front of a vehicle to generate image information;
a controller configured to generate a light distribution command for instructing a light distribution pattern to be formed in the region in front of the vehicle, based on the image information from the camera;
a headlight configured to irradiate the region in front of the vehicle such that the instructed light distribution pattern is obtained, based on the light distribution command;
a marker generator fixed with respect to the headlight and configured to irradiate a predetermined region in front of the vehicle with a marker; and
a position calibrator configured to detect a positional deviation between the camera and the headlight based on a position of the marker appearing in the image information when the marker generator irradiates the region in front of the vehicle with the marker.

* * * * *